INVENTOR.
WILLIAM H. TWIDALE
BY Tweedale & Gerhardt
ATTORNEYS.

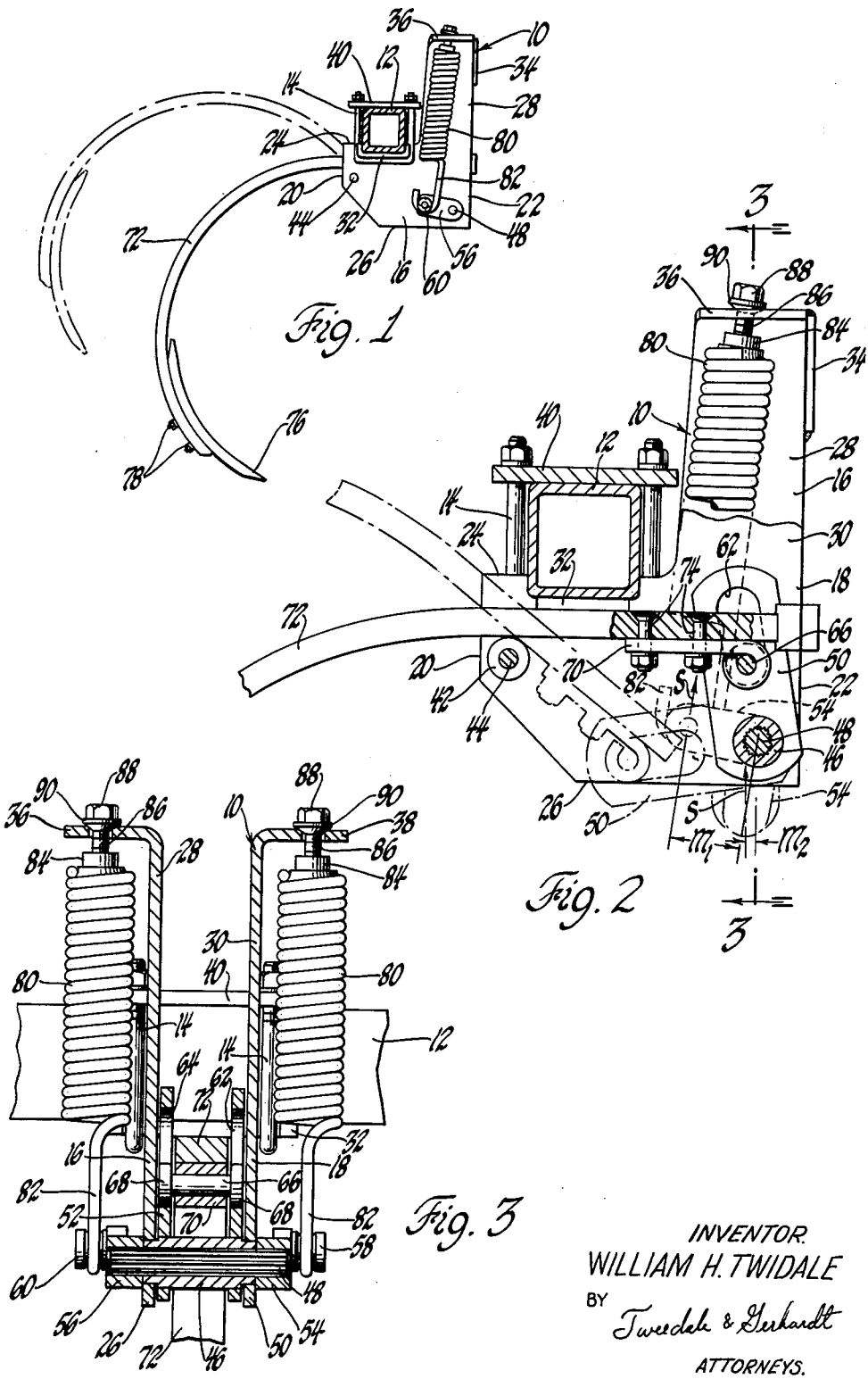

United States Patent Office 3,223,175
Patented Dec. 14, 1965

3,223,175
CULTIVATOR SPRING TRIP MOUNTED
ASSEMBLY
William Harold Twidale, Islington, Ontario, Canada, assignor to Massey-Ferguson Limited, Ontario, Canada
Filed Oct. 19, 1964, Ser. No. 404,694
10 Claims. (Cl. 172—264)

This invention relates to cultivating tools, and more particularly to spring trip mechanisms for causing the cultivating tool to rapidly swing upwardly about its mounting to clear large rocks and other obstructions encountered during cultivating.

During cultivating operations, large rocks, stumps and other obstructions are frequently encountered by the cultivating tools. In order to prevent damage to the cultivating tools, they are sometimes mounted on the implement frame in such a manner that the tool will respond to excessive forces upon engagement with obstructions by swinging upwardly to clear the obstruction. Moreover, for efficient operation, the tool should automatically return to its operative, earthworking position and penetrate the ground as soon as the obstruction has been passed.

If the cultivating tool trips prematurely, or moves out of the ground upon slight increases in the resistance forces, uneven, or incomplete cultivation will result. On the other hand, the tool must trip rapidly before excessive stresses build up that would break or damage the tool, and the tool must be returned to its operative, earthworking position with sufficient force to cause it to again penetrate the surface of the ground.

An object of this invention is therefore to provide a spring trip mounting assembly for a cultivating tool in which the forces tending to hold the tool in its operative position will rapidly decrease when excessive forces are encountered by the tool to permit the tool to rapidly move to a tripped or inoperative position clearing the obstruction, the mechanism thereafter causing the tool to automatically return to its normal, earthworking position with sufficient force to penetrate the ground surface.

Another object is to provide a spring trip mounting for a cultivating tool permitting the tool to move from an operative, earthworking position to a tripped, inoperative position for clearing obstructions in which the forces tending to hold the tool in its operative position progressively decrease and increase as the tool moves respectively from and toward the operative position.

The foregoing, and other objects are achieved by the provision of an assembly including a bracket on which is rotatably mounted a shaft having a pair of radially projecting arms. A cultivator shank is mounted on the bracket for pivotal movement between an operative, earthworking position, and a tripped position, and is pivotally and slideably connected with one of the arms to cause the shaft and arms to rotate upon movement of the shank. The shank is restrained against movement from its operative position by a spring connected between the bracket and the other of the radially directed arms. In the operative, earthworking position of the shank, the arm to which the spring is secured is positioned such that the moment arm between the spring force and the shaft axis is at a maximum and progressively decreases as the shank moves from its operative position. Consequently, the forces resisting movement of the tool from its earthworking position rapidly decrease as the shank pivots to its tripped position. However, the spring force does not move past the shaft axis in the fully tripped position of the shank, with the result that the spring force continually exerts a return force on the shank with the return force progressively increasing as the shank moves toward the operative position to cause the tool to penetrate the earth and resume cultivating operations.

Other objects, advantages and features of the invention will become apparent from the following description taken in connection with the accompanying drawings in which:

FIG. 1 is a side view of a spring trip assembly embodying the invention;

FIG. 2 is an enlarged view, similar to FIG. 1, with certain parts being broken away;

FIG. 3 is a sectional view taken on lines 3—3 of FIG. 2;

Figure 4:
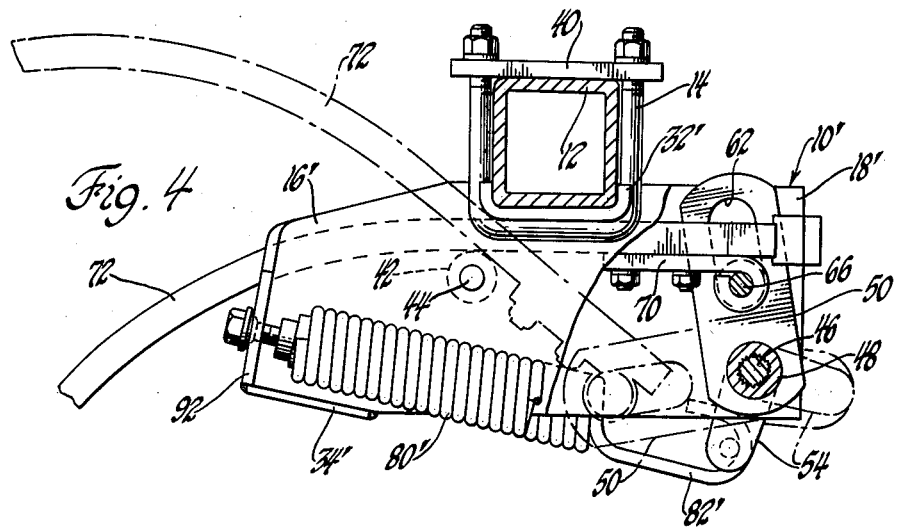
FIG. 4 is a side view of a modification of the spring trip assembly of FIG. 1.

While specific embodiments of the invention are illustrated and described, it should be understood that the invention is not limited to the exact construction shown. On the contrary all alterations and modifications in the construction and arrangement of parts, as well as all equivalents falling within the scope and spirit of the invention are intended to be covered by the present invention.

With reference to FIGS. 1–3, reference numeral 10 designates collectively a bracket which is secured to a beam or implement frame member 12 by U-bolts 14. Bracket 10 is made up of a pair of spaced, parallel plate members 16 and 18 having front, rear, upper and lower edges 20, 22, 24 and 26, respectively. Upwardly projecting leg members 28 and 30 are formed at the rear of plate members 16 and 18, respectively.

Plate members 16 and 18 are secured together in spaced, substantial parallel relationship with respect to each other by an abutment plate 32 which is welded between the upper edges of the plates. A plate 34 is welded or otherwise secured to the upper ends of leg members 28 and 30 as shown in FIGS. 1 and 2. Leg members 28 and 30 are formed with outwardly projecting flanges at 36 and 38, respectively. U-bolts 14 extend around abutment plate 32 and cooperate with a clamping plate 40 on the upper side of frame member 12.

Mounted between plates 16 and 18 near the rear edges thereof is a fulcrum member 42 in a form of a roller mounted on a pin or shaft 44. Shaft 44 has its ends mounted in plates 16 and 18. Rotatably mounted in plates 16 and 18 between the lower front edges thereof is a sleeve member 46. The sleeve member 46 is internally splined for receiving a splined shaft 48, the ends of which projects outwardly from plates 16 and 18. Welded or otherwise non-rotatably mounted on sleeve 46 is a pair of spaced, parallel links or arms 50 and 52 which extend radially from the axis of shaft 48 between plates 16 and 18. Secured to the outer ends of shaft 48 is a pair of spring support arms 54 and 56. Link 50 and arm 54 constitute one pair of radially projecting arms which rotate as a unit with shaft 48, and the link 52 along with arm 56 constitute a second pair of radially projecting arms which also rotate as a unit with shaft 48.

Links 50 and 52 are formed with elongated slots 62 and 64, respectively, for receiving a pin 66 (FIG. 3) having rollers 68 mounted on its ends and engaged with the walls of the slots. The pin 66 is carried by a hinge plate 70 secured to a cultivator shank 72 by means of conventional screw fasteners 74. Shank 72 carries a cultivating tool 76, which may be in a form of a chisel plow or the like, by means of conventional screws 78 (FIG. 1).

The cultivator shank 72 is received between plates 16 and 18 and is slideably and pivotally supported on fulcrum roller 42 for pivotal movement about roller 42 between an operative earthworking position as shown in full lines in FIGS. 1 and 2 and an inoperative, tripped position as shown by the broken lines in FIGS. 1 and 2.

Shank 72 is biased towards its operative position by springs 80 which are interconnected with shank 72 by means of arms 50, 52, 54, 56 and shaft 48. The lower end 82 of springs 80 are engaged with the spring support members 58 and 60 projecting laterally from the outer end of arms 54 and 56, respectively. The springs 80 are each secured at their upper ends to a spring support fitting 84 having a shank 86 which is received in openings in flanges 36 and 38 of legs 28 and 30, respectively, and secured thereto by means of a bolt 88 and a conical washer 90.

Shank 72 is shown in the full line position of FIGS. 1 and 2 in its operative, earthworking position in which it engages the abutment plate 32 on its lower side with pin 66 being located at the lower end of slots 62 and 64 of links 50 and 52, respectively. Spring arm 54 is positioned such that the force of spring 80 represented by arrow S acts through a moment arm M1 tending to rotate shaft 48 in a clockwise direction as viewed in FIG. 2. Consequently, the force acting on the cultivator 76, which is transmitted to link 50 through pin 66, is resisted by the force of spring 80 tending to rotate shaft 48 in the opposite direction in order to trip the shank, the forces on the cultivating tool must be sufficient to overcome the resisting moment exerting by spring 80.

When tool 76 encounters a rock or other obstruction, the force builds up through pin 66 to overcome spring 80 and acts through link 50 to rotate shaft 48 in a counter-clockwise direction against the force of spring 80. As the force on tool 76 pulls shank 72 rearwardly, pin 66 and rollers 68 move along the length of slots 62 and 64 of links 50 and 52, respectively, causing the shaft 48 to rotate in a counter-clockwise direction and swing arms 54 and 56 downwardly from the position shown in FIG. 2. As arms 54 and 56 rotate downwardly, the moment arm of spring force S with respect to the axis of rotation of shaft 48 decreases to rapidly reduce the effect of spring 80 and thus the resistance of shaft 48 to movement of the shank from the operative position. When pin 66 reaches the opposite or outer end of slots 62 and 64, the force of spring 80 has been moved toward the axis of shaft 48 to reduce the moment arm to the distance designated generally at M2 in FIG. 2. Thus, the resistance of moment of spring 80 is substantially reduced as shank 72 moves towards its tripped position but is sufficient to return shank 72 to its operative position since the spring does not move over center with respect to the axis of shaft 48.

In the embodiment of FIG. 4, wherein parts corresponding to the embodiment of FIGS. 1–3 are indicated by the same reference numerals, a bracket 10' is made up of spaced plate members 16' and 18' having outwardly projecting flanges 92 at their rear edges. The spring support arms 54 and 56 on shaft 46 projects in a generally downward direction when shank 72 is in its operative position. Spring 80' is connected in tension between flange 92 and spring arm 54 as in the previously described embodiment. Movement of shank 72 to its tripped position, as shown in broken lines in FIG. 4, causes the outer end of spring arms 54 and 56 to move toward the right in a counter-clockwise direction to shift the line of force of spring 80' toward the axis of shaft 46 to reduce the moment arm of the spring force with respect to the shaft.

Figure 5:
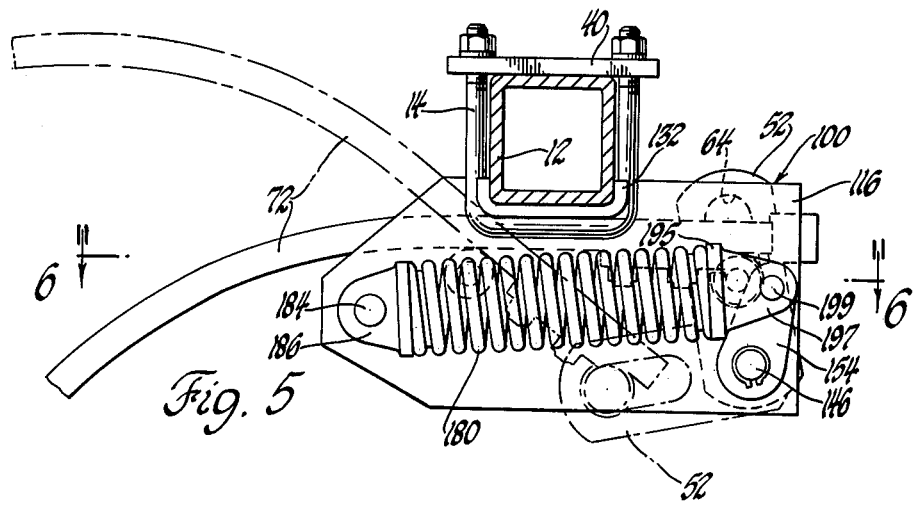
FIG. 5 is a side view of still of another modification.
Figure 6:
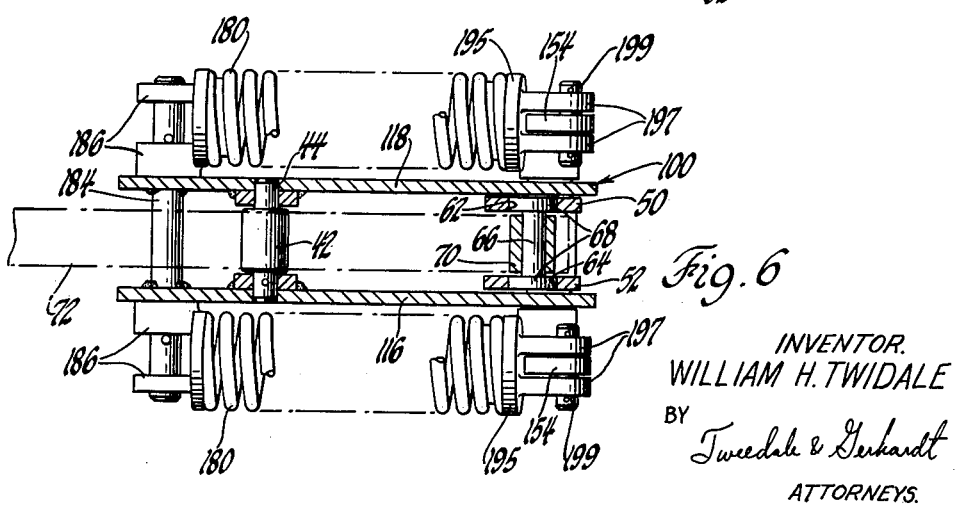
FIG. 6 is a sectional view taken on lines 6—6 of FIG. 5.

In the embodiment of FIGS. 5 and 6, the cultivator shank is biased to its operative position by a compression spring as opposed to the tension springs of the previous embodiments. A bracket 100 is made up of plates 116 and 118 in which is mounted a rod 184 for supporting one end of the compression spring 180 (FIG. 6). Compression spring 180 is rotatably mounted on rod 184 by means of apertured lugs 186. The other end of the compression spring is seated on a fitting 195 having spaced apertured ears 197 secured to spring arm 154 by a pin 199 passing through the aligned openings in the members. Movement of shank 72 from its operative to tripped position as shown in FIG. 5 causes spring arm 154 to rotate in a counter-clockwise direction about shaft 146 to compress spring 180 and at the same time move the line of force of spring 180 toward the axis of shaft 46 to reduce the moment arm of the spring force.

In each of the embodiments, when the shank is in its fully tripped position, the tool 76 carried thereby is moved out of the ground, and springs 80, 80' and 180 have moved near to, but not past the center of shaft 46 and consequently continuously exert a return force on the shank to cause it to return to the operative position. Since the moment arm of the spring force increases as the shank moves from its tripped position, resistance to the tool penetrating the ground is quickly overcome as the spring force increases.

It will be understood by those skilled in the art that various alterations in the construction and arrangement of parts can be made without departing from the scope and spirit of the invention as defined by the appended claims.

1. A spring trip assembly including a bracket, a cultivator shank pivotally mounted on the bracket for movement between an operative, earthworking position and an inoperative tripped position with respect to said bracket, and a spring connected between said bracket and said shank operative to resiliently restrain said shank against movement from its operative position and to resiliently urge the shank to return to the operative position from the tripped position characterized by having means interconnecting said shank and said spring operable to progressively decrease and increase the force of the spring acting on said shank as the shank respectively moves from and returns to its operative position, said interconnecting means comprises a shaft rotatably mounted on said bracket and having a pair of radially projecting arms, and means pivotally and slideably connecting said shank with one of said arms to rotate said shaft upon movement of the shank between its operative and tripped positions, and movable away from and toward the axis of said shaft as the shank moves from and returns to the operative position, respectively, said spring being connected with the other of said arms to resist movement of the shank from its operative position, said other arm moving the line of action of the spring toward and away from said shaft as the shank moves from and returns toward its operative position, respectively.

2. The construction of claim 1 wherein said means pivotally and slidably connecting said shank with said one arm comprises a pin carried by said shank and a slot formed in said one arm, said pin being engaged in said slot and movable along said slot upon rotation of said one arm about the axis of said shaft.

3. A cultivator spring trip assembly comprising: a pair of plate members secured together in spaced, substantially parallel relationship and having front, rear, upper and lower edges; an abutment member extending between said plate members near the upper edges thereof; a fulcrum member extending between said plate members near the rear edge thereof; a shaft rotatably mounted between said plate members near the front edges thereof with its ends projecting outwardly from said plate members; at least one link non-rotatably mounted on said shaft between said plates; at least one arm member non-rotatably mounted on one of the outwardly projecting ends of said shaft; a cultivator shank supported on said fulcrum member between said plates for pivotal and rearward sliding movement on said fulcrum from an operative, earthworking position in engagement with said abutment member to a tripped position out of engagement with said abutment member; means pivotally and slideably connecting said shank with said link for rotating said shaft, link and arm upon movement of said shank between said operative and tripped positions, said connecting means moving along the length of said link away from and toward the shaft as the shank moves toward the tripped and operative positions, respectively; and a spring having one end connected with said arm member and its other end secured to the associated plate member for biasing the shank to its operative position; said arm member rotating with said shaft to move said one end of said spring about the rotational axis of said shaft to respectively decrease and increase the moment arm of the spring force with respect to the shaft as the shank moves toward the tripped and operative positions, respectively.

4. The construction of claim 3 wherein said fulcrum member is in the form of a roller rotatably mounted between said plate members.

5. The construction of claim 4 further including a leg member projecting upwardly from the forward edge of said plate members, said other end of said spring being secured adjacent the upper end of the leg member of said associated plate member to act in tension to resist movement of the shank from its operative position.

6. The construction of claim 5 wherein said other end of said spring is secured to said associated plate member adjacent the rear edge thereof.

7. The construction of claim 6 wherein said spring acts in tension to resist movement of the shank from its operative position.

8. The construction of claim 6 wherein said spring acts in compression to resist movement of said shank from its operative position.

9. A cultivator spring trip assembly comprising: a support member; a shaft rotatably mounted on said support member; a link non-rotatably mounted on said shaft and extending radially therefrom; a cultivator shank connected with said link with a pin and slot connection and fulcrumed on said support member at a point spaced from said shaft for pivotal movement between an operative position and a tripped position to act through said link to rotate said link and said shaft, said pin moving from one end of said slot to the other as said shank moves from its operative to tripped position; a spring support arm non-rotatably mounted on said shaft and extending radially therefrom; and a spring having one end connected with said support member and its other end connected with the end of said spring support arm, said end of the spring support arm moving about the axis of said shaft upon rotation of said shaft to reduce the moment arm between the spring force and shaft axis as the cultivator shank moves from its operative to tripped position.

10. A cultivator spring trip assembly comprising: a bracket having a horizontal abutment; a fulcrum mounted on said bracket vertically spaced from said abutment; a shaft rotatably mounted on said bracket; a link mounted on said shaft for rotation therewith and extending radially therefrom; a cultivator shank pivotally and slideably connected with said link and supported on said fulcrum for pivotal movement between an operative position in engagement with said abutment and a tripped position in which it is pivoted about said fulcrum out of engagement with said abutment to cause said link and shaft to rotate, the connection between said shank and said link moving toward and away from the rotational axis of said shaft as said shank moves toward its operative and tripped positions, respectively; a spring support arm mounted on said shaft for rotation therewith and extending radially therefrom; and a spring having one end connected with said bracket and its other end connected with the end of said spring support arm spaced from said shaft to bias said cultivator shank against movement from its operative position; said end of said spring arm moving said other end of said spring about the rotational axis of said shaft to reduce the moment arm between the spring force and axis of said shaft as the cultivator shank moves from its operative to tripped position.

References Cited by the Examiner
UNITED STATES PATENTS 989,232 4/1911 Copeland _____ 172—710

ABRAHAM G. STONE, *Primary Examiner.*

ANTONIO F. GUIDA, *Examiner.*